United States Patent [19]

McDonald et al.

[11] Patent Number: 5,915,113
[45] Date of Patent: Jun. 22, 1999

[54] VISUAL APPLICATION PARTITIONING FOR CREATING DISTRIBUTED OBJECT ORIENTED APPLICATIONS

[75] Inventors: Richard Denison McDonald, Scarborough; Vladimir Klicnik, Oshawa, both of Canada

[73] Assignee: International Business Machines Corp., Armonk, N.Y.

[21] Appl. No.: 08/777,688

[22] Filed: Dec. 20, 1996

[30] Foreign Application Priority Data

Dec. 21, 1995 [CA] Canada ................................. 2165893

[51] Int. Cl.⁶ ..................................................... G06F 9/45
[52] U.S. Cl. ........................... 395/702; 395/701; 395/683; 395/684; 395/200.51; 345/335; 345/339; 345/967; 707/103; 707/104
[58] Field of Search ......................... 395/200.31, 200.33, 395/682, 683, 684, 701, 702, 200.51, 200.6; 345/335, 340, 337, 967, 333, 339, 346, 356, 433; 707/10, 102, 103, 104

[56] References Cited

U.S. PATENT DOCUMENTS

| | | | |
|---|---|---|---|
| 4,853,843 | 8/1989 | Ecklund ................................... | 707/203 |
| 5,457,797 | 10/1995 | Butterworth et al. .................. | 395/682 |
| 5,724,556 | 3/1998 | Souder et al. .......................... | 395/500 |

OTHER PUBLICATIONS

Welch et al. "Metrics and Techniques for Automatic Prrtitioning and Assignment of Object–based Concurrent Programs" IEEE, pp. 440–447, Oct. 28, 1995.

Hebbel, Fred "Distributed Object Oriented Systems" IEEE, pp. 137–145, Feb. 5, 1996.

IBM Technical Disclosure Bulletin, vol. 34, No. 11, Apr. 1992 pp. 340–350, "Stimulating Shared Buffer Communication in a Distributed Processing Environment".

Primary Examiner—Tariq R. Hafiz
Assistant Examiner—Tuan Q. Dam
Attorney, Agent, or Firm—Gregory M. Doudnikoff

[57] ABSTRACT

A software partitioning tool is disclosed. Based on a visual display of an application that shows program objects and the connections or interactions between the objects, an internal representation of the application is defined. As the user interacts with the visual display of the application, creating new partitions and relocating program objects in the new partitions, the internal representation of the display is constantly updated. Once a connection between program objects crosses partition boundaries, it is redefined in the internal representation as a distributed interaction (a connection), and representative server and client stubs are defined. At a number of points, the user also has the opportunity to set middleware protocols. Once the user commits to a distribution design, a code generator in the tool generates the actual server and client stubs for all distributed connections based on the definitions in the internal representation of the application.

12 Claims, 6 Drawing Sheets

VISUAL APPLICATION PARTITIONING FOR CREATING DISTRIBUTED OBJECT ORIENTED APPLICATIONS

The present invention is directed to a software generation tool that permits the user to create a distributed application in an object oriented environment from mappings developed on a graphical user interface (GUI). The invention is also directed to a computer implemented method involving partitioning of applications into components and generating interfaces between the components in response to user-selected patterns of partitioning.

BACKGROUND

As discussed in U.S. Pat. No. 5,457,797 entitled "Flexible Multi-Platform Partitioning for Computer Applications" of Forte Software Inc., the dual trends in computer development of placing increasingly powerful processors in workstations in personal computers (PC's), coupled with rapidly improving connectivity has permitted the development of distributed applications.

Distributed applications refers to the paradigm in which software elements that must cooperate to fulfill the purpose of an application or complete a transaction, are spread over multiple parallel processors. One advantage of this is that applications requiring substantial support from other applications can be run over a network of linked workstations or PC's, each with modest memory and processing capacity, rather then requiring a very large computer to run the application and all of its dependencies.

Another advantage of distributing large and complex applications is that each distributed part of the application is separately compiled, and can be updated and recompiled without having to recompile the entire application.

In response to the trend toward the use of distributed systems, technologies have evolved to provide a procedural base for the smooth interaction of the multiple hardware components that can form the system.

For example, Distributed Computing Environment® (DCE) of the Open Software Foundation is one recently evolved technology that permits applications distributed over a number of different processors or systems to communicate and interact effectively in order to share software resources. DCE utilizes an interfacing mechanism known as the remote procedure call (RPC), to transparently handle the details of communications (such as different data formats, security, etc.) between systems. Using RPCs, a client computer can access and use application software located not only on parallel processors, but also on processors located on different platforms, in a heterogeneous network.

The Object Management Group (OMG) evolves the RPC oriented distribution mechanisms to the world of objects with its Common Object Request Broker Architecture (CORBA). Object method calls are transparently directed from the client object to the server object through the object request broker implementations on the respective systems. A complementary set of distributed object services, defined by OMG, handles the creation, destruction and other object lifecycle services across the different execution platforms, as well as aspects of distribution such as naming, persistence, event handling, security and more.

This is the type of technology available to permit an application to be created with components spread over multiple processors, to effectively utilize the hardware resources of an entire network to run the large application.

The usual approach to creating distributed applications requires the original software developer to consider the details of distribution before developing the body of the application. This is quite complicated, since it involves ascertaining, in advance which functions will be most frequently called and should therefore reside on the same processor or local node, so that the number of messages sent over the network is minimized and response times in complex workloads is decreased.

In the case of object oriented applications, the functions are involved through calls to a class constructed on the processor memory stack. Using the traditional approach, then, the developer must take the following steps in addition to building the standalone application;

1. Determine which class interfaces within the application are to be distributed;
2. Determine and set the middleware characteristics for each distributed interface;
3. Split the application into multiple executables, each communicating using the distributed interfaces.

One simpler way of determining which objects are to be distributed is to analyze the application for static links between objects. Where there are few links, a logical distribution point may exist. However, this is not the optimal way to determine split points. Typically, the split point would be decided based on the traffic across the interface for a given workload, those interactions with low flow are potential split points. Other considerations are data placement considerations, security and application management. Therefore, one problem for the application developer is correctly determining these split points within the application to maximize processing effectiveness while keeping response time to a minimum.

A problem for the application developer in connection with determining and setting the middleware characteristics for each distributed application is the complexity of determining the correct settings and reflecting them in the application. For each distributed interface, the developer must code appropriate files containing middleware settings and middleware startup commands. These may be imbedded in application code or provided as a set of configuration files. For the case of some middlewares, such as DCE, an interface definition (.idl) file must be provided.

The developer may have to contend with settings that differ across the application. For example, an application may be a DCE application using application level protection across it, but one interface may require session level protection. Setting this correctly may be difficult.

Another problem for the developer using the traditional approach in creating distributed applications is the complexity and error prone nature of actually splitting the application. Once the distributed classes have been identified, the existing application has to be split up into modules that can execute in different processes on, in most cases, different machines. The developer has to physically split up the code into multiple build environments and deploy the components across the different systems. The major problem with this is ensuring that all of the required interfaces have been written. However, viewing only code listings makes it very difficult for the programmer to locate all of the split points to do this.

The three problems identified above with developing object oriented distributed applications are solved by providing a technique which infers distribution characteristics of the application through visual interaction with the developer. This has been implemented in the present invention in a toolset consisting of:

1. An application partitioning tool; and
2. A code generator.

Partitioning is defined for the purposes of this invention as the technique of dividing a monolithic or standalone application into multiple interconnected components. Each component is called a partition. Dividing an application into partitions is called partitioning.

Accordingly, the present invention provides a method for creating a distributed application for an object oriented environment. The method consists of the following computer implemented steps. An application layout is displayed in a visual environment illustrating program object parts and connections between the objects. An internal representation of the displayed application is defined and, in response to user action displaying at least one partition boundary, the partition boundary is defined in the internal representation. In response to user action relocating at least one program object on the displayed application so that its connection with other program objects cross said at least one partition boundary, these connections are defined as distributed connections in the internal representation. From the distributed connections, server objects and client objects are determined, and in response to a user commit action, server code structure with a distributed interface for each server part is generated and a client stub with the distributed interface for every client part corresponding to each server part is generated.

Preferably, the method further consists in receiving middleware characteristics for the server part and including those characteristics in the distributed interface generated for the server code structure and the client stub.

The invention also provides a method for creating a distributed application for an object oriented environment having a visual building component adapted to display an application design input by a user, the displayed application design having multiple program objects and connections between said objects representing method calls. The method consists of the computer implemented steps of initially defining an internal representation of the objects and connections of the displayed application design. In response to user definition of at least one partition boundary in the displayed application design, corresponding empty partition containers are defined in the internal representation. In response to user relocation of at least one program object across the at least one partition boundary in the displayed application design, the program object is redefined in the internal representation as a distributed object and its connections crossing said at least one partition boundary as distributed connections. In response to a user commit action, code is generated that includes middleware characteristics for every distributed connection defined in the internal representation.

The present invention is also directed to a software development tool for designing and coding a distributed application that is adaptable to interoperate with a visual building component for displaying an application as multiple program objects having connections between them representing method calls, for displaying discrete partitions having boundaries, and for permitting a user to relocate program objects across partition boundaries while maintaining the visual representation of connections between the objects. The tool includes a metadata generator for defining a current internal representation of the displayed application and for defining any connections crossing partition boundaries in the displayed application as distributed connections in the current internal representation, and a code generator for generating distributed interfaces for all distributed connections defined in the current internal representation. The code generator is activated by user action.

In addition, the invention is directed to a computer program product that comprises computer usable medium having new, useful and nonobvious combination of "computer readable program code means" embodied therein for creating a distributed application for an object oriented environment having a visual building component adapted to display an application design input by a user where the displayed application design has multiple program objects and connections between said objects representing method calls. The computer readable program code means in the computer program product consists of computer readable program code means for causing the computer to initially define an internal representation of the objects and connections of the displayed application design, and computer readable program code means for causing the computer, in response to user definition of at least one partition boundary in the displayed application design, to define corresponding empty partition containers in the internal representation. The computer readable program product also includes computer readable program code means for causing the computer, in response to user relocation of at least one program object across said at least one partition boundary in the displayed application design, to redefine said at least one program object in the internal representation as a distributed object and its connections crossing said at least one partition boundary as distributed connections. The computer readable program product includes, in addition, computer readable program code means for causing the computer, in response to a user commit action, to generate code including middleware characteristics for every distributed connection defined in the internal representation.

A preferred embodiment of the present invention will now be described in association with the accompanying drawings, in which.

DETAILED DESCRIPTION OF THE PREFERRED EMBODIMENTS

The present invention permits an application developer or other user to create a distributed application from an existing application using a visual builder to visualize the application and its connections in order to make optimal partitions. For the original software developer, this simplifies the creation of distributed applications greatly, since the standalone application can first be designed without regard to the intricacies of distribution, which can be added later using the present invention.

The preferred embodiments of the invention are implemented to permit a user developing $C^{++}$ programs, an object-oriented programming language, to design these as distributed applications. In one embodiment, the developer can define the distributed application using a set of reusable parts or modules defined in a tool such as IBM's VisualAge™ C++ for OS/2® visual builder. In another embodiment, the developer defines the application using standard C++ handcrafting of header and program files.

Figure 1:
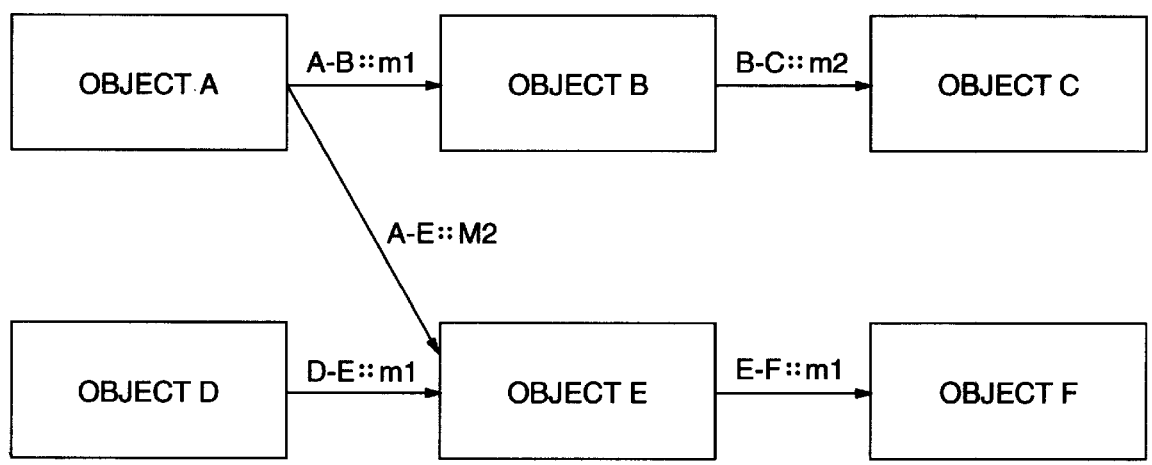
FIG. 1 is a diagrammatic representation of a monolithic application having multiple method calls.

FIG. 1 illustrates a typical monolithic application consisting of a number of objects, A through F, and the interactions between them. Each object calls (invokes) a method in another object. For example, object A calls method m1 of object B. This is an internal method call, that is, the call from A to B is processed in one processor.

Figure 2:
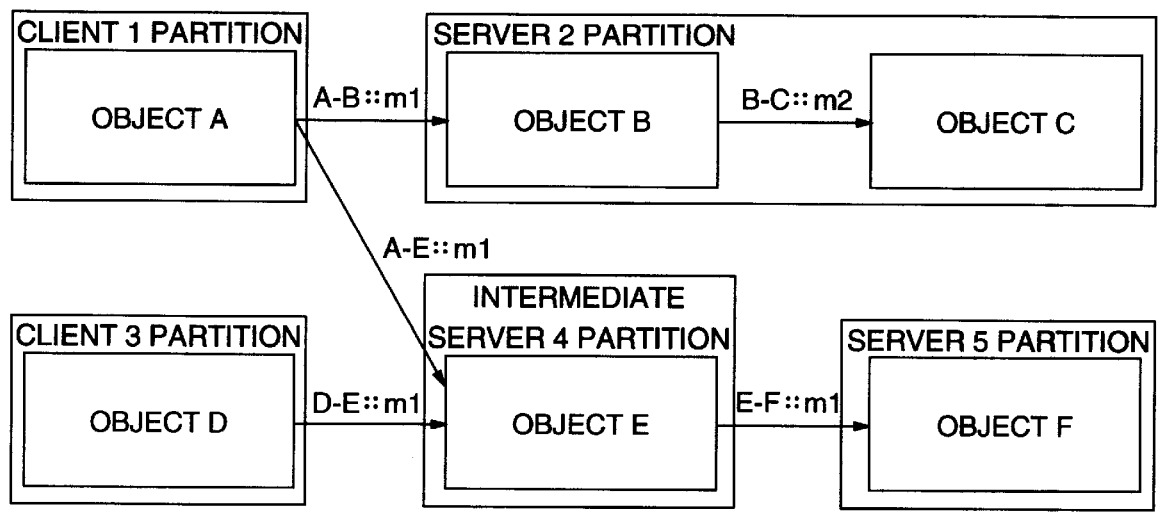
FIG. 2 is a diagrammatic representation of the application of FIG. 1 distributed over multiple partitions.

FIG. 2 illustrates the same application where the objects have been distributed over multiple partitions. Now, the method call from A to B is a distributed or external call in that B now resides on a different processor than A. According to the design of the partitioning in FIG. 2, all of the calls are now distributed except B's call on method m2 of C.

Figure 3:
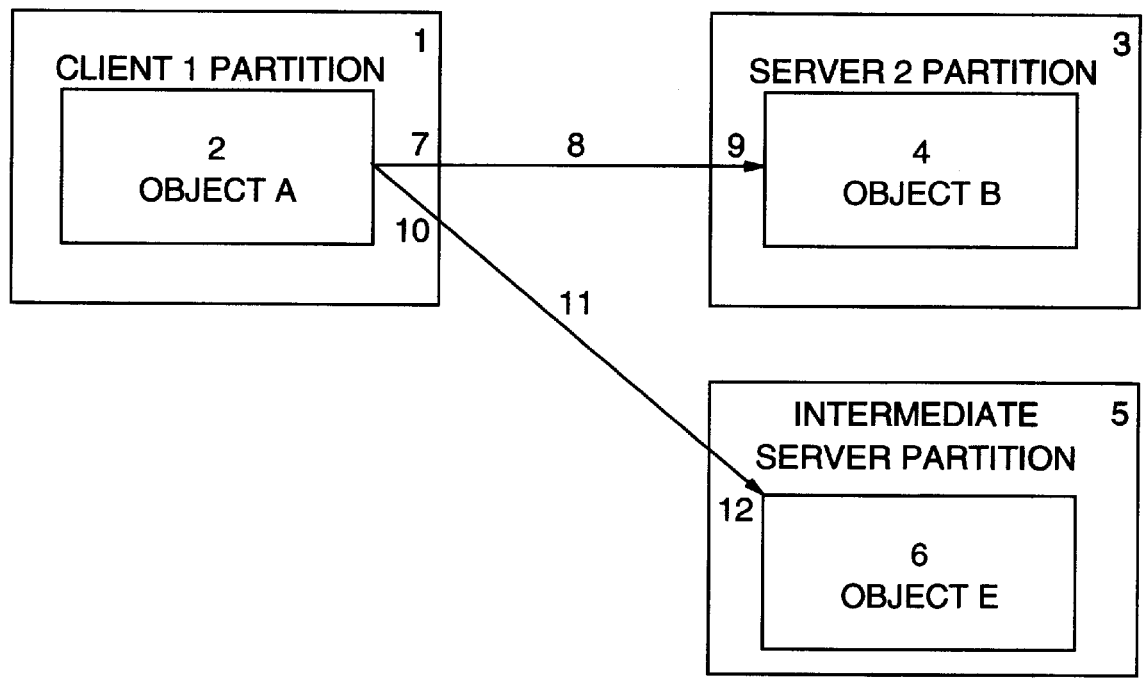
FIG. 3 is a detail of FIG. 2 illustrating the components in a distributed procedure call.

FIG. 3 shows a detail of the partitioned application schematically illustrated in FIG. 2 to highlight the components of the interconnections between distributed objects. The first client partition 1 contains client object A (2) which uses the services of objects B and E (4,6) located in the second and fourth partitions (3,5) respectively. Each partition sets the middleware defaults for its contained objects.

The connection representing the method call between objects A and B consists of a first client stub (7) describing object A's use of object B, a first interface (8) providing the middleware services between the first and second partitions (1,3) and a server stub (9) for object B.

The connection representing the method call between objects A and E consists of a second client stub (10) describing object A's use of object E, a second interface (11) providing the middleware services between the first and fourth partitions (which could be different than the middleware required for communication between the first and second partitions), and a server stub (12) for object E.

Figure 4:
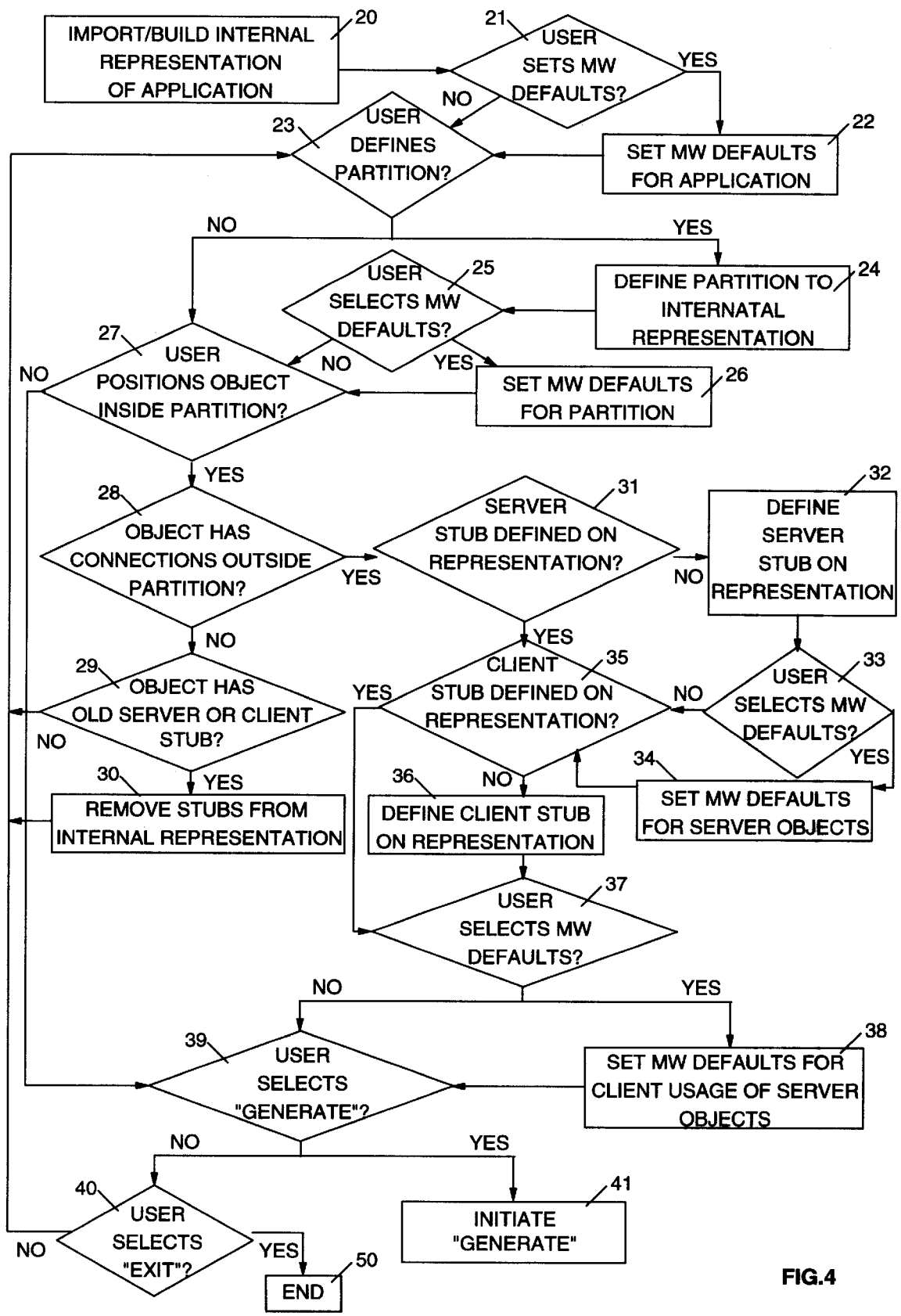
FIGS. 4 and 5 are flow diagrams showing the computer-implemented steps for creating a distributed application from a monolithic application design according to the invention.
Figure 5:
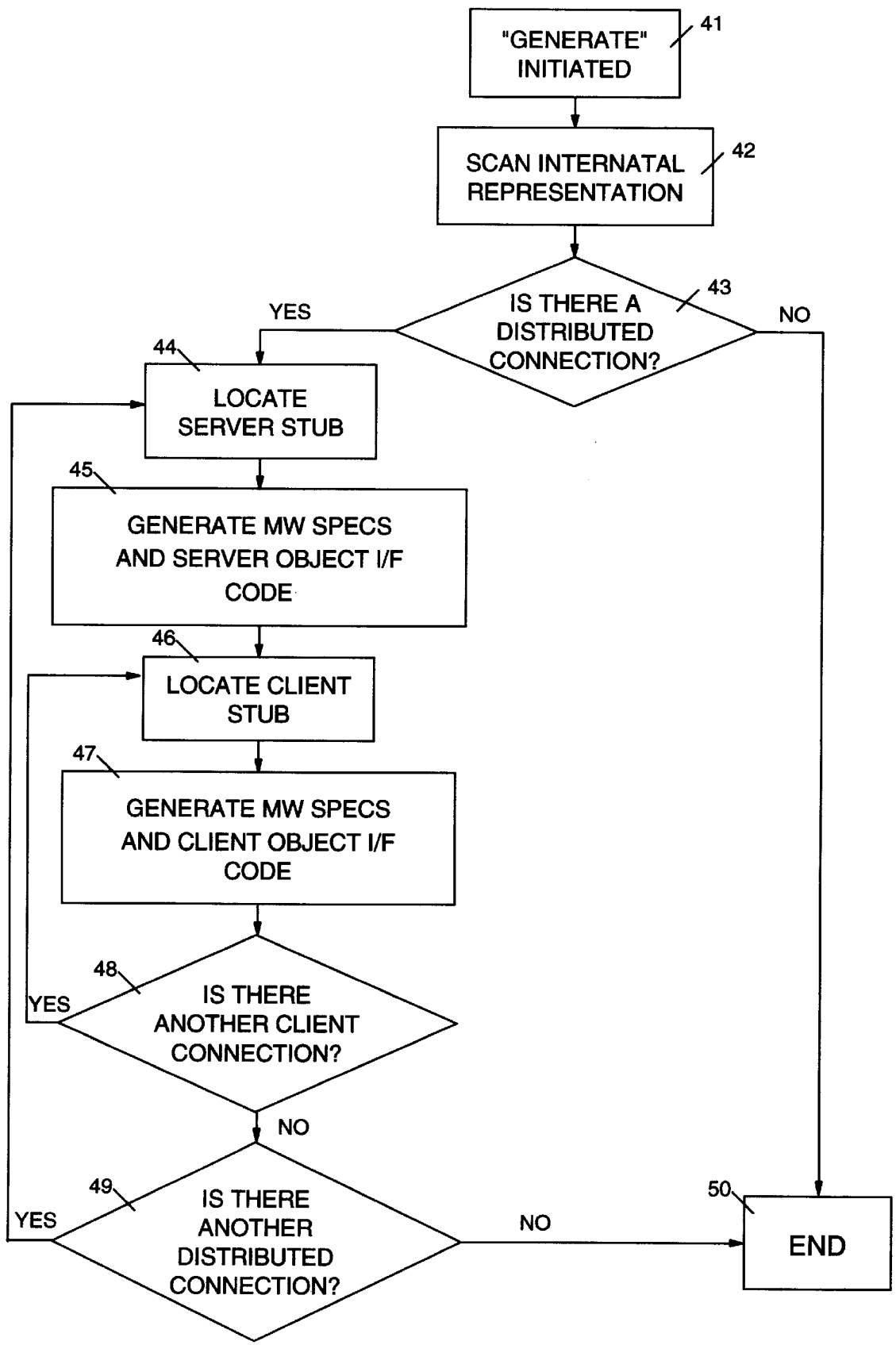

The method followed in the invention in order to create a distributed application is set forth in the flow diagrams of FIGS. 4 and 5.

Using a tool like the VisualAge C++ visual builder, the basic components of an application, the program objects and the connections or interactions between them can be illustrated visually in much the same manner as shown in FIG. 1. All of the program objects can be thought of as contained within a single partition, and the lines represent the connections or interactions that are internal in the application. These interactions have a direction implied by the source and target of the connection. Each connection has a direction associated with it. The part that is the source of the connection is implied to the client. The part that is the target of the connection is implied to the server. Therefore, in FIG. 1, part A is the source of the connections implied to each of parts B and E. Part E is the target of connections implied to each of parts D and A, and is itself the client of connections implied from part F.

It should be pointed out that the present invention is optimally intended for use during design of distributed applications. Therefore, the "program objects" need not be fully defined at the time the partitioning tool of the preferred embodiment is used; it is sufficient if the class design or object interfaces and the object interactions are known prior to implementing partitioning.

Once a visual building tool has been used to create a representation of the application design, the partitioning tool of the present invention imports the representation and builds an internal representation or model based on "metadata" (block 20, FIG. 4). The internal representation or model is viewed as being within one partition. At this point, the user has the option of setting the middleware defaults for the entire application, both what middlewares will be used and how they will be used (blocks 21,22). Common middlewares that might be used are DCE, MQI or TCP/IP. Setting the defaults would include making decisions such as whether DCE security services will be used, etc.

The user can create new partitions or partition containers, which are initially empty, on the visual display (block 23). In the preferred embodiment a known technique is employed for creating the partition graphic of selecting a partition creation tool from a tool palette and selecting the creation of a partition at a designated place in the display. Visually, the partitions could be delineated by simple border outlines, different coloured areas, or other known techniques for differentiating areas on a visual display. The visual representation of the new partition container(s) is concurrently reflected in the internal model of the application (block 24). Because each new partition potentially represents a separate processor on which program objects for the application will reside, the user may set middleware defaults on creating the new partitions (blocks 25,26).

The user can begin moving objects to the new partitions on the visual display (block 27). In the preferred embodiment, the user moves the objects using a "drag-and-drop" technique that is implemented using known technology. Other possible techniques that could be implemented to instantiate an object in a partition include clicking on an object and then on an empty partition container; selecting transfer locations for objects through listbox entries, etc. When an object is moved to a new partition, its connections with other objects (the connecting lines on FIG. 2) are maintained on the visual display.

However, each connection that now crosses partition boundaries implies a distribution point within the application. For example, from the re-design of the application shown in FIG. 2, distributed calls are intended to be made when object A calls object B or object E. Therefore, a determination must be made whether the newly instantiated object has any connections outside the partition in which it has been placed (block 28 of FIG. 4). If it does not, then any previously defined distributed connections in the internal representation must be removed (blocks 29, 30).

If the object does have connections beyond the partition, this is reflected concurrently in the internal model; that is, the connections crossing partitions are rebuilt as distributed connections in the internal representation in the following way.

The direction of calls implies which parts are clients, which are services ("server") and which are both, and from this, information can be gathered regarding the server for each call and the client usage of the service provided by the server. For example, regardless of the type of the part, the specific part being called can be identified. In the case of the partitioning illustrated in FIG. 2, even if object B and object E are of the same type, object E is uniquely identified as compared to object B. This is referred to as the object's Universally Unique Identifier (UUID). Using the implicit definition of the "server" object of a connection that crosses partition boundaries, a server stub is defined in the internal representation if it has not already been defined for another connection (blocks 30, 31). At this first definition of the server stub, the user can specify middleware characteristics specific to the server object (block 33,34), as well as information on how the client object uses the server in a representation of what the actual coded stub will contain.

Whether or not the server stub must be defined in the internal representation, the stub for the client object of the connection is defined as a representational stub in the internal model if it has not already been defined (blocks 35, 36). The user can select middleware settings that are specific to this client's use of the server object it calls (blocks 37,38).

Once all desired partitioning in the visual representation of the application has been designed, the user takes a "commit" action. In the preferred embodiment, the user selects the "Generation" action in order to initiate code generation (blocks 39,41), the steps of which are shown in FIG. 5.

If the user is not to commit to the visual partitioning, the partitioning tool can be exited, with or without saving the work done (blocks 40, 50).

FIG. 5 takes up the method of the present invention after code generation has been initiated (block 41). Scanning the internal representation of the visually partitioned program (block 42), distributed connections are located (block 43). For each distributed connection in the internal representation, the server stub representation is located (block 44).

A code generation feature in the preferred embodiment generates the stub code structure for the server from reusable templates (block 45). This server stub includes the middleware specific protocols for startup and configuration of the interface, as well as the server-specific protocols such as security requirements and the UUID to call the original part. Where the server will be available to several objects, or even to objects from other programs, the server stub can be generated to support multiple middlewares.

The middleware is determined either by the settings specified by the user, or by the default settings for the partition in which the distributed object now resides or for the application itself.

The specific middleware characteristics providing the basis for code generation can be obtained from a class library, as described in co-pending patent application Ser. No. 08/709,085, filed Sep. 6, 1996, entitled "Method and Apparatus for Assigning Policy Protocols In A Distributed System" now U.S. Pat. No. 5,822,521, or the code can be separately provided for each middleware.

Once the internal representation of the client stub has been located, client stub code can be generated in the representation (blocks 46,47). The representation of the client stub includes information that the client is explicitly using a specific server, and, using this, the same interface as the target part is generated to be included in the stub. The generated client stub also includes appropriate middleware startup calls, calls to security and name services, data marshaling, and, eventually, the actual call to the service. This is repeated for all client connections to the particular server (block 48).

For each connection, the client and server stub code also include code to do appropriate marshaling of the parameters including the correct order for creating and destroying object as the application is run.

Figure 6:
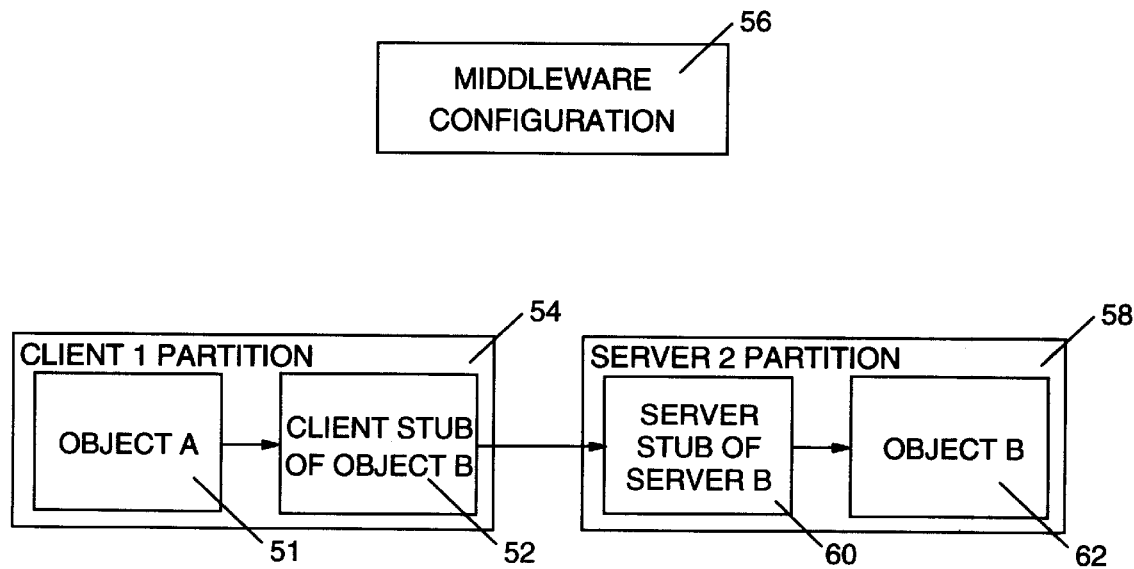
FIG. 6 is a diagrammatic representation of the code generated for the newly partitioned application, according to the invention.

The structure of the generated code is illustrated in FIG. 6. Object A's executables (51) are linked to the generated client stub of object B (52) contained in the first partition (54). The client stub (52) includes the appropriate middleware protocols (56) to support a distributed call from the first partition (54) to the second partition (58), where it is received by the server stub of server B (60), which is in turn linked to the executables of object B (62).

The steps for code generation are repeated for every distributed connection in the internal model of the distributed application until all have been identified (blocks 49,50 of FIG. 5).

In a further embodiment, the present invention can be used to create a distributed application from a monolithic application developed using standard $C^{++}$ hand crafting of header and program files.

The class definition is found in the $C^{++}$ .hpp header files, and by use of the present invention, the user can easily transform this local header file into a file representing a distributed interface.

The user creates a visual partitioning of the application which is internally represented following the steps illustrated in FIG. 4.

However, following the user's initiation of code generation (FIG. 5), the following files are generated in lieu of server and client stubs:

1) .hpf—the original $C^{++}$ header file providing the interface that the object has become a distributed I/F client 2) .hpp—providing server support 3) .cpp—provides protocols for the middleware, supporting both the client and the server.

Further modifications that would be obvious to a person skilled in the art are intended to be covered by the appended claims.

We claim:

1. A method for creating a distributed application for an object oriented environment comprising the computer implemented steps of:

displaying an application layout in a visual environment illustrating program object parts and connections between the objects;

defining an internal representation of the displayed application;

in response to user action, displaying at least one partition boundary and defining said at least one partition boundary in the internal representation;

in response to user action, relocating, on the displayed application, at least one program object so that its connection with other program objects cross said at least one partition boundary and defining said connections as distributed connections in the internal representation;

determining from said distributed connections server objects and client objects; and in response to a user commit action, generating server code structure with a distributed interface for each server part and generating a client stub with the distributed interface for every client part corresponding to said each server part.

2. The method according to claim 1, further comprising the steps of receiving specific middleware characteristics for the server part and including said characteristics in the distributed interface generated for the server code structure and the client stub.

3. A method for creating a distributed application for an object oriented environment having a visual building component adapted to display an application design input by a user, the displayed application design having multiple program objects and connections between said objects representing method calls, the method comprising the computer-implemented steps of:

initially defining an internal representation of the objects and connections of the displayed application design;

in response to user definition of at least one partition boundary in the displayed application design, defining corresponding empty partition containers in the internal representation;

in response to user relocation of at least one program object across said at least one partition boundary in the displayed application design, redefining said at least one program object in the internal representation as a distributed object and its connections crossing said at least one partition boundary as distributed connections; and in response to a user commit action, generating code including middleware characteristics for every distributed connection defined in the internal representation.

4. A method, according to claim 3, wherein the internal representation is built based upon metadata.

5. A method, according to claim 3, wherein the step of initially building an internal representation comprises building a single partition and locating all program objects of the application within said single partition whereby all method calls between said program object are initially defined as local method calls.

6. A method, according to claim 3, further comprising the step of defining middleware defaults setting for said empty partition containers in response to user selection of middleware protocol options in the displayed application.

7. A method, according to claim 3, wherein the step of redefining connections crossing said at least one partition boundary as distributed connections, comprises, for each distributed connection:

inferring one program object of the connection as a server object and another program object of the connection as a client object;

defining a representation of a server stub and middleware protocols for the server object; and defining a representation of a client stub for the client object.

8. A method, according to claim 7, wherein the code is generated according to the representations defined of the server and client stubs.

9. A software development tool for designing and coding a distributed application, the tool being adaptable to interoperate with a visual building component for displaying an application as multiple program objects having connections between them representing method calls, for displaying discrete partitions having boundaries, and for permitting a user to relocate program objects across partition boundaries while maintaining the visual representation of connections between the objects, the tool comprising:

a metadata generator for defining a current internal representation of the displayed application and for defining any connections crossing partition boundaries in said displayed application as distributed connections in the current internal representation; and a code generator for generating distributed interfaces for all distributed connections defined in the current internal representation, said code generator being activated by user action.

10. A software development tool, according to claim 9, further comprising a repository of reusable code modules, each module defining middleware protocols, and means for accessing an appropriate module when generating a distributed interface.

11. A software tool, according to claim 10, wherein the repository of reusable code modules comprises coded templates.

12. A computer program product comprising:

a computer usable medium having computer readable program code means embodied therein for creating a distributed application for an object oriented environment having a visual building component adapted to display an application design input by a user, the displayed application design having multiple program objects and connections between said objects representing method calls, the computer readable program code means in said computer program product comprising:

computer readable program code means for causing the computer to initially define an internal representation of the objects and connections of the displayed application design;

computer readable program code means for causing the computer, in response to user definition of at least one partition boundary in the displayed application design, to define corresponding empty partition containers in the internal representation;

computer readable program code means for causing the computer, in response to user relocation of at least one program object across said at least one partition boundary in the displayed application design, to redefine said at least one program object in the internal representation as a distributed object and its connections crossing said at least one partition boundary as distributed connections; and computer readable program code means for causing the computer, in response to a user commit action, to generate code including middleware characteristics for every distributed connection defined in the internal representation.

* * * * *